US010572193B2

(12) United States Patent
Van Vliembergen et al.

(10) Patent No.: US 10,572,193 B2
(45) Date of Patent: Feb. 25, 2020

(54) CONTROLLER FOR A PRINTER CAPABLE OF PRINTING MULTIPLE IMAGES SIMULTANEOUSLY

(71) Applicant: Océ Holding B.V., Venlo (NL)

(72) Inventors: Eduardus J. W. Van Vliembergen, Venlo (NL); Elsemieke P. A. Van Rossum, Eindhoven (NL)

(73) Assignee: OCÉ HOLDING B.V., Venlo (NL)

( * ) Notice: Subject to any disclaimer, the term of this patent is extended or adjusted under 35 U.S.C. 154(b) by 0 days.

(21) Appl. No.: 16/161,510

(22) Filed: Oct. 16, 2018

(65) Prior Publication Data

US 2019/0121583 A1    Apr. 25, 2019

(30) Foreign Application Priority Data

Oct. 24, 2017  (EP) .................................... 17197903

(51) Int. Cl.
*G06F 3/12* (2006.01)
*H04N 1/00* (2006.01)

(52) U.S. Cl.
CPC .......... *G06F 3/1205* (2013.01); *G06F 3/1204* (2013.01); *G06F 3/1207* (2013.01); *G06F 3/1234* (2013.01); *G06F 3/1251* (2013.01); *G06F 3/1256* (2013.01); *G06F 3/1259* (2013.01); *G06F 3/1274* (2013.01); *G06F 3/1282* (2013.01); *H04N 1/00408* (2013.01); *H04N 1/00567* (2013.01)

(58) Field of Classification Search
None
See application file for complete search history.

(56) References Cited

U.S. PATENT DOCUMENTS

| | | |
|---|---|---|
| 2009/0059289 A1 | 3/2009 | Shintoku et al. |
| 2015/0022845 A1 | 1/2015 | Roscoe et al. |
| 2015/0093049 A1* | 4/2015 | Roumier ............... G06F 3/1205 382/311 |
| 2016/0210088 A1* | 7/2016 | Van Den Branden ...................... H04N 1/3876 |
| 2016/0347085 A1* | 12/2016 | Cloots ....................... B44C 5/04 |

OTHER PUBLICATIONS

European Search Report of application 17 19 7903 dated Apr. 6, 2018.

* cited by examiner

*Primary Examiner* — Andrew H Lam (74) *Attorney, Agent, or Firm* — Birch, Stewart, Kolasch & Birch, LLP (57) ABSTRACT

A controller for a printer, a printing system, method for controlling a printer and a software medium are disclosed. The controller includes a process monitor configured to determine which images of a plurality of images are currently being processed simultaneously by the printer; and a display configured to indicate to a user, based on the determining by the process monitor, which images of the plurality of images are currently being processed simultaneously by the printer.

16 Claims, 5 Drawing Sheets

CONTROLLER FOR A PRINTER CAPABLE OF PRINTING MULTIPLE IMAGES SIMULTANEOUSLY

FIELD OF THE INVENTION

The present invention relates to a controller for a printer capable of printing multiple images simultaneously, to a printing system comprising a printer capable of printing multiple images simultaneously and a controller, to a method for controlling a printer capable of printing multiple images simultaneously and to a software medium comprising executable program code.

BACKGROUND ART

Controllers for printers control how, in which order and with which properties images are processed by a printer. The processing of the images includes at least the actual printing, that is the application of a marking medium such as ink onto a substrate such as paper. As images vary in size while the medium is often of a standard format, for example a roll of a substrate in a roll-to-roll printer, often multiple images are processed, in particular printed, simultaneously to increase efficiency of the printing.

For example, a nesting logic may be provided as part of a controller of a printing system which are configured to nest multiple images, of the same or even of different print jobs, to arrange them most efficiently on a substrate. Such nesting may be based on criteria such as saving printing time, saving marking medium, saving substrate and/or on priorities given to the individual images.

Nesting in this context means taking a plurality of individual images and arranging at least some of them side-by-side in a direction perpendicular to the direction the roll of recording medium is moving. In addition, gaps left by e.g. some larger images on the recording medium roll may be filled by one or more smaller individual images, thus reducing the amount of recording medium used for printing the larger and the smaller images compared to printing them one after the other along the recording medium roll.

Nesting therefore contributes to reduce the amount of the recording medium needed by fully utilizing both the length of the recording medium (along the direction the recording medium is moving) and the width of the recording medium (perpendicular to that direction of moving).

Print jobs, which comprise at least one image and optionally data relating to properties of the at least one image and/or to settings with which the images are to be printed, are always presented as a list to be processed one after the other. Accordingly, it is very difficult for a user wishing to modify or abort a certain print job, to understand if this is possible at the moment and what the results of such modifying or aborting will be when the printer is currently processing, in particular printing, multiple images, or print jobs, simultaneously.

As a typical example, the user may send an abort command in order to stop printing of an image A shown in the print queue list as currently active. However, by sending the abort command, the user may when sending the abort command, abort all printing of the printer at once so that also the printing of image B (which the user did not want to abort) is interrupted, potentially wasting expensive marking material and/or recording medium.

SUMMARY OF THE INVENTION

It is therefore one of the objects of the present invention to provide a controller for a printer capable of printing multiple images simultaneously which grants an operator or a user of said printer better and more accurate control of the printer, in particular when trying to modify or abort print jobs or images already submitted to the printer.

According to a first aspect, the invention provides a controller for a printer capable of processing, in particular printing, multiple images simultaneously, comprising: a process monitor configured to determine which images of a plurality of images are currently being processed simultaneously by the printer; and a display configured to indicate to a user, based on the determining by the process monitor, which images of the plurality of images are currently being processed simultaneously by the printer.

The process monitor may be realized in hardware, such as a circuit or a printed circuit board and/or comprising transistors, logic gates and other circuitry. Additionally, the process monitor may be at least partially realized in terms of software. Accordingly, the process monitor may comprise, or be operatively coupled to, a processor and a memory storing a software or a firmware that is executed by the processor to perform the functions of the process monitor. Signals may be received by an input interface of the process monitor and signals that the processor of the process monitor creates may be outputted by an output interface of the process monitor. The process monitor may be implemented as a microcontroller, an ASIC, an FPGA and so on. The process monitor may also comprise sensors such as optical sensor, electricity sensor and the like.

The processing of the images by the printer, as the terms are used herein, may comprise in particular:
- printing, that is, applying a marking material such as ink onto a recording medium (or "medium" for short) such as paper;
- cutting a recording medium, such as an individual sheet or a medium roll in a roll-to-roll printer, using a cutter, for example to isolate or individualize printed images from one another and/or trim the finished images;
- curing an image, that is, applying a radiation such as ultraviolet radiation to a marking material such as UV curable ink, to render said curable marking material inert;
- drying an image, for example by directing hot and/or cold air streams along the recording medium after marking material has been applied to it;
- and/or other or further steps.

According to a second aspect, the invention provides a printing system comprising a printer capable of processing, in particular printing, multiple images simultaneously, and a controller according to the first aspect operatively coupled to said printer.

According to a third aspect, the invention provides a method for controlling a printer, the method comprising steps of:
- receiving a plurality of images;
- processing, by the printer, multiple images of the plurality of images simultaneously;
- determining which images of the plurality of images are currently being processed simultaneously by the printer; and
- indicating to a user which images of the plurality of images have been determined to be currently being processed simultaneously by the printer.

According to a fourth aspect, the invention provides a software medium comprising executable program code configured to, when executed, perform the method of the third aspect. The software medium may be used to create, or enable, a printing system according to the second aspect.

The present invention grants an operator of a printing system, in particular a user of a controller for a printer, better and more precise control over the individual images and/or jobs, in particular when an error occurs or when at least one image or print job has to be aborted. The operator of the controller is enabled to find out quickly and reliably which images and/or print jobs are affected by an error or would be affected by an abortion or pause of the printing, either now or at a time specified by the operator, and is so able to mitigate effects of the error, abort or pause, respectively. Additionally, the operator is enabled to schedule a pause or an abort of an image or print job for a time in the future at which, for example, a certain image is not among the images being currently processed, specifically printed, by the printer.

Further variants and additional modifications will be apparent from the subject-matter of the dependent claims as well as from the description and the corresponding figures.

In some embodiments, the controller may comprise an error handler configured to determine whether an error has occurred during printing by the printer.

The error handler may be realized in hardware, such as a circuit or a printed circuit board and/or comprising transistors, logic gates and other circuitry. Additionally, the error handler may be at least partially realized in terms of software. Accordingly, the error handler may comprise, or be operatively coupled to, a processor and a memory storing a software or a firmware that is executed by the processor to perform the functions of the error handler. Signals may be received by an input interface of the error handler and signals that the processor of the error handler creates may be outputted by an output interface of the error handler. The error handler may be implemented, at least partially, as a microcontroller, an ASIC, an FPGA and so on.

The controller may further be configured to apply an error handling procedure to all of the images that were affected by the occurred error, based on the determining by the process monitor, specifically, based on, according to the determining by the process monitor, which images of the plurality of images were being processed simultaneously at a time at which said error had occurred.

In this way, the operator of the controller is enabled to, for example, decide which images or print jobs have to be re-printed (in case that the occurred error affected images being printed during the occurrence of the error), which images or print jobs have to be cured again (in case that said images were currently being cured, or scheduled to being cured, by a curing unit at the occurrence of the error) and so on.

In some advantageous embodiments, the controller further comprises: a cutting monitor configured to determine which, or the vicinity of which, of the plurality of images is currently being cut by a cutter. The cutter may be any sort of cutting machine or cutting device such as a cutting plotter, a roll-to-roll cutter, a roll cutting machine and so on. The cutting monitor may be realized as part of the process monitor, or as separate from the process monitor.

The cutting monitor may be realized in hardware, such as a circuit or a printed circuit board and/or comprising transistors, logic gates and other circuitry. Additionally, the cutting monitor may be at least partially realized in terms of software. Accordingly, the cutting monitor may comprise, or be operatively coupled to, a processor and a memory storing a software or a firmware that is executed by the processor to perform the functions of the cutting monitor. The cutting monitor may share a processor and/or a memory with the process monitor.

Signals may be received by an input interface of the cutting monitor and signals that the processor of the cutting monitor creates may be outputted by an output interface of the cutting monitor. The cutting monitor may be implemented, at least partially, as a microcontroller, an ASIC, an FPGA and so on. The cutting monitor may also comprise sensors such as optical sensor, electricity sensor and the like.

Advantageously, the display is further configured to indicate to the user the images currently being cut by the cutter, based on the determining of the cutting monitor. Thus, the user is given information what the result would be if the user would control the cutter to stop, or to operate, immediately.

In some advantageous embodiments, the controller further comprises a curing monitor configured to determine which of the plurality of images is currently being cured by a curing unit. The curing unit may be any sort of curing machine or curing device that is able to cure, i.e. render less active or inactive, a marking material. For example, the curing unit may comprise at least one UV lamp configured to emit UV lamp with such wavelengths as to cure a UV-curable ink that is used as a marking material. The curing monitor may be realized as part of the process monitor, or as separate from the process monitor.

The curing monitor may be realized in hardware, such as a circuit or a printed circuit board and/or comprising transistors, logic gates and other circuitry. Additionally, the curing monitor may be at least partially realized in terms of software. Accordingly, the curing monitor may comprise, or be operatively coupled to, a processor and a memory storing a software or a firmware that is executed by the processor to perform the functions of the curing monitor. The curing monitor may share a processor and/or a memory with the process monitor.

Signals may be received by an input interface of the curing monitor and signals that the processor of the curing monitor creates may be outputted by an output interface of the curing monitor. The curing monitor may be implemented, at least partially, as a microcontroller, an ASIC, an FPGA and so on. The curing monitor may also comprise sensors such as optical sensor, electricity sensor and the like. For example, the optical properties of a portion of marking material deposited on a recording medium may be probed using an optical sensor in order to determine whether said portion of marking material has already been cured by the curing unit or not.

Advantageously, the display may further be configured to indicate to the user the images currently being cured by the curing unit.

In some advantageous embodiments, the controller further comprises at least one interface configured to receive the plurality of images and for receiving property data indicating properties of the printer and/or of a medium supplied to the printer for printing thereon. The controller may further comprise a nesting logic configured to create and/or update printing instructions for the printer based on properties of the received images and/or based on the property data, the printing instructions indicating to the printer in which arrangement the printer is to print the plurality of images onto the medium. The process monitor is preferably configured to determine which images of the plurality of images are currently being printed simultaneously using the printing instructions.

The nesting logic may be realized in hardware, such as a circuit or a printed circuit board and/or comprising transistors, logic gates and other circuitry. Additionally, the nesting logic may be at least partially realized in terms of software. Accordingly, the nesting logic may comprise, or be operatively coupled to, a processor and a memory storing a software or a firmware that is executed by the processor to perform the functions of the nesting logic. Signals may be received by an input interface of the nesting logic and signals that the processor of the nesting logic creates may be outputted by an output interface of the nesting logic. The nesting logic may be implemented, at least partially, as a microcontroller, an ASIC, an FPGA and so on.

In some advantageous embodiments, the controller further comprises a user interface configured to receive an abortion command from a user. An abortion command may be understood as any command indicating that at least a part of the processing, of at least one of the plurality of images should be aborted, or at least paused. The nesting logic may be configured to update the printing instructions for the printer to abort, or pause, at least the part of the processing of the at least one of the plurality of images indicated by the abortion command. With the user interface, the user may, being informed by the display what the results of issuing a certain abortion command at a specific moment in time would be, issue the abortion command at an opportune moment.

In some advantageous embodiments the nesting logic is configured such that, when at least one of the images indicated by the abortion command is one of the images being currently processed as determined by the process monitor, the printing instructions for the printer are updated such that, of the images being currently processed, only the images indicated by the abortion command are aborted, whereas images not indicated by the abortion command continue to be processed.

In some advantageous embodiments, the abortion command comprises an indication that at least one of the images is to be finished before printing is aborted. The nesting logic may be configured such that, when at least one of the images indicated to be finished by the abortion command is one of the images being currently processed as determined by the process monitor, the printing instructions for the printer are updated such that, of the images being currently processed, at least the images indicated by the abortion command to be finished are finished before the processing of the at least one of the plurality of images indicated by the abortion command is aborted.

In some advantageous embodiments, the display is further configured to display a graphical representation of the plurality of images according to the arrangement of the images indicated by the printing instructions. Additionally, or alternatively, the display may further be configured to display a graphical indication, based on the determining of the process monitor, of which images are currently being processed simultaneously.

In some advantageous embodiments of the second aspect, the printing system may comprise a cutter, wherein the controller includes a cutting monitor. In some advantageous embodiments of the second aspect, the printing system may comprise a curing unit, wherein the controller includes a curing monitor.

BRIEF DESCRIPTION OF THE DRAWINGS

The present invention will become more fully understood from the detailed description given hereinbelow and the accompanying schematic drawings which are given by way of illustration only, and thus are not limitative of the present invention, and wherein.

DETAILED DESCRIPTION OF THE DRAWINGS

The present invention will now be described with reference to the accompanying drawings, wherein the same reference numerals have been used to identify the same or similar elements throughout the several views, and in some instances throughout the several embodiments.

Figure 1:
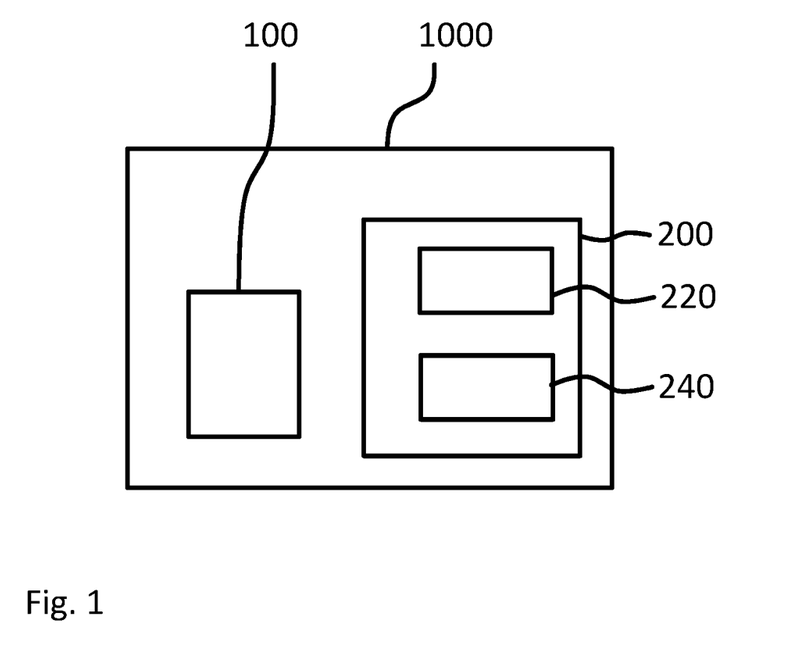
FIG. 1 a schematic block diagram of a printing system according to an embodiment of the second aspect as well as a controller according to an embodiment of the first aspect.

FIG. 1 shows a schematic block diagram of a printing system 1000 according to the second aspect of the present invention. The printing system 1000 comprises a printer 100 capable of printing multiple images simultaneously and a controller 200 for the printer 100. In other words, the controller 200 is configured to control the printer 100, specifically to control a processing, in particular printing, of images by the printer 100. The controller 200 is an embodiment of the first aspect of the present invention.

The controller 200 comprises a process monitor 220 configured to determine which images of a plurality of images are currently being processed simultaneously by the printer 100. In particular, the process monitor 220 is configured to determine which images of the plurality of images are currently being printed simultaneously by the printer, that is, marking material related to which images is currently being deposited onto a medium by the printer 100.

The process monitor 220 may be realized at least partially as hardware and/or at least partially as software, as has been described in the foregoing.

The process monitor 220 may be configured to determine, for at least one step during the processing of the images by the printer 100, which images of the plurality of images currently being processed according to that specific step by the printer 100. One of the steps during the processing of the images by the printer 100 is the printing itself, that is the application of marking material onto a medium such as paper. Accordingly, the process monitor 220 may be configured to, at least, determine which images of the plurality of images are currently being printed simultaneously by the printer. Alternatively, or additionally, the process monitor 220 may be configured to determine which other steps of the processing of the images are currently being performed simultaneously and for which images.

The controller 200 also comprises a display 240 configured to indicate to a user or operator, based on the determining by the process monitor 220, which images of the plurality of images are currently being processed simultaneously by the printer. The display 240 may for example be a touch screen display or a liquid crystal display. The display 240 may be locally connected to the process monitor 220. Alternatively, the process monitor 220 and the display 240 may be connected over a network such as the internet. The display may be realized, for example, within an App or a browser window run by a remote computer or mobile device such as a laptop, a smartphone, a tablet computer, a PDA and so on.

The process monitor 220 itself may be realized as a local device in the vicinity of the printer 100 but may also be realized as a remote device or a remotely run software module, run for example by a remote server such as a cloud server.

As has already been described in the foregoing, the controller 200 may comprise an error handler, e.g. an error handler software module, which recognizes error states of the controller 200, of the printer 100 or of any other part of the printing system 1000, and reacts to them. Based on the determining, by the process monitor 220, which images are currently being processed (and, preferably, according to which step of the processing), the error handler may be provided with the information which images have been affected by a certain error state recognized by the error handler.

For example, the error handler may have access to a table that instructs the error handler which error states affect which steps of the processing of images. Accordingly, the error handler may be configured to automatically apply an error handling function in which the error state is removed or alleviated, to all of the images that were being processed in one of the steps affected by the error state.

Figure 2:
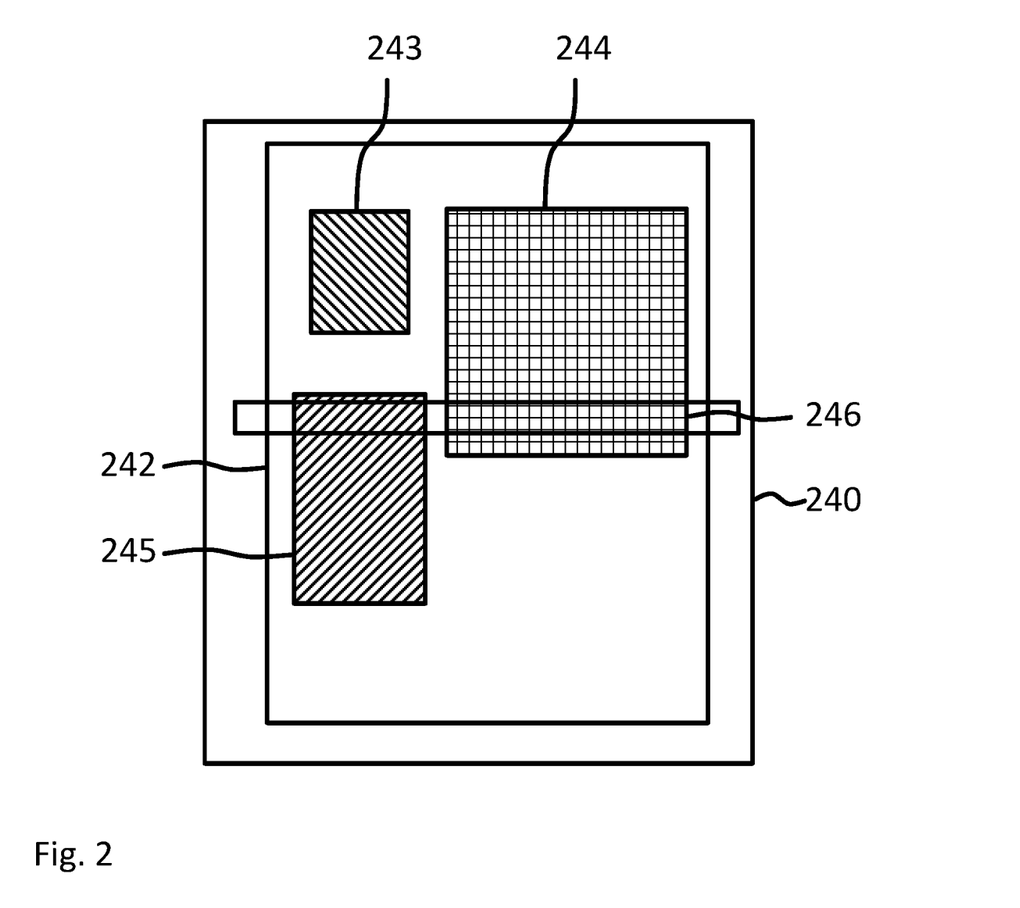
FIG. 2 a schematic diagram of an exemplary graphical interface, or a part of a graphical interface, displayed by the display of the printing system or the controller shown in FIG. 1.

FIG. 2 shows a schematic diagram of an exemplary graphical interface, or a part of a graphical interface, displayed by the display 240.

According to FIG. 2, the display 240 shows a graphical representation 242 of a medium which is marked by the printer 100 for printing the images. For example, the medium may be a sheet of paper or a roll of paper, a roll of a textile or the like. Arranged within said graphical representation 242 of the medium, graphical representations 243, 244, 245 of images of the plurality of images are displayed. The arrangement of the graphical representations 243-245 of the images within the graphical representation of the mediums 242 may correspond closely, or exactly, to the actual arrangement in which the images are printed onto the medium, for example, according to printing instructions provided by a nesting logic, as will be described in the following with respect to FIG. 3.

As shown in FIG. 2, the display 240 is also configured to show a graphical representation 246 of a print swath of a print head of the printer 100 and/or a graphical representation of a location, specifically a current location, of said print swath. Again, the graphical representation 246 may be arranged exactly as the actual print swath of the print head of the printer 100 currently arranged with respect to the images of which the graphical representations 243-245 are displayed.

Information from the printer 100 where the actual current print swath is located with respect to the images to which the printing instructions relate may be transmitted from the printer 100 to the controller 200 within a printer output signal 72.

The graphical representations 243-245 of the images may advantageously comprise scaled-down and/or simplified versions of the actual images, such as thumbnails, in order to allow a user or an operator of the controller 200 to immediately discern which graphical representation 243-245 represents which image. In addition, or alternatively, the graphical representations 243-245 may comprise alphanumerical indications of data related to the images such as file names, dimensions, an order number within a list, and so on.

In the example shown in FIG. 2, the user or operator of the controller 200 is able to understand immediately that the images represented by the graphical representations 244, 245 are currently being printed since the graphical representation of the print swath 246 overlaps both of these two graphical representations 244, 245.

It will be understood that also images that are currently being processed in other steps than being printed, for example images that are currently being cut or cured or the like, may also be highlighted to the user by the display 240. For example, those images cut be displayed surrounded by a frame of a certain color, or a symbol indicating cutting or curing could be displayed on top of each image that is currently being cut or cured, respectively.

Figure 3:
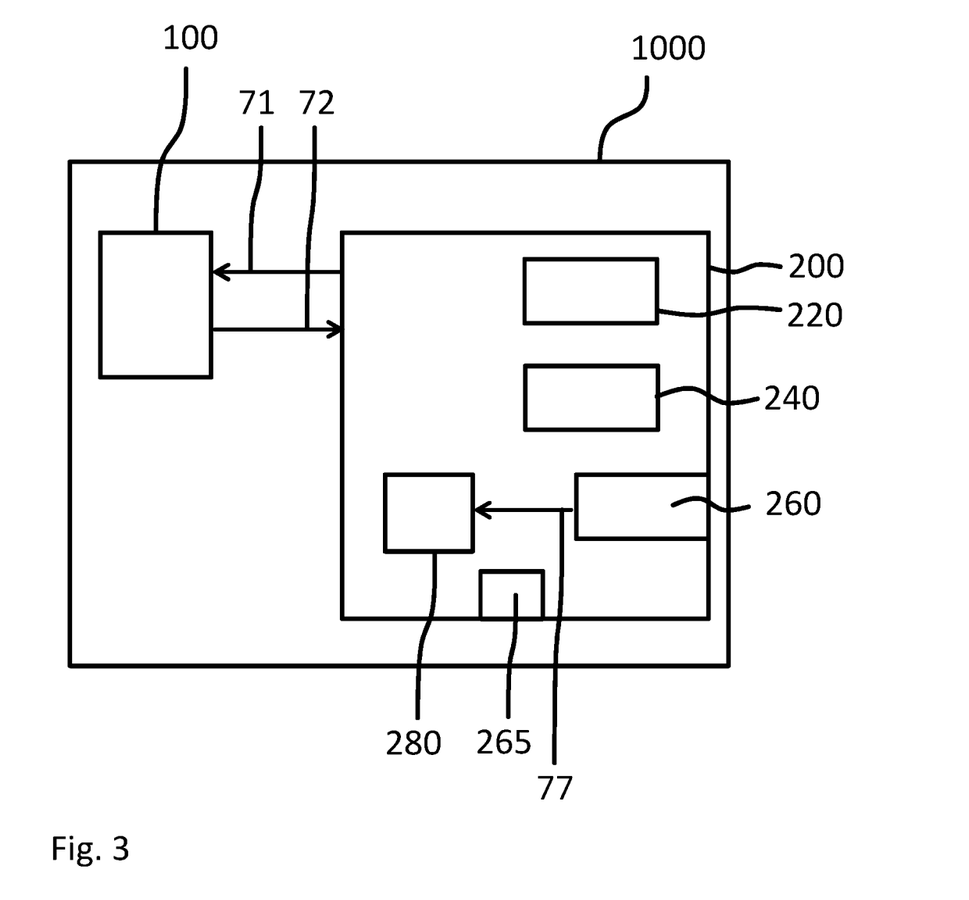
FIG. 3 a schematic block diagram of a printing system according to another embodiment of the second aspect as well as a controller according to another embodiment of the first aspect.

FIG. 3 shows a schematic block diagram of a printing system 1000 in variant from the printing system 1000 discussed with respect to FIG. 1.

The controller 200 in the variant according to FIG. 3 comprises a nesting logic 280 configured to create and/or update printing instructions for the printer 100 which indicate, usually among other items, in which arrangement the printer 100 is to print the plurality of images onto the recording medium.

The process monitor 220 may receive a data signal from the nesting logic 280. Using this data signal from the nesting logic 280, the process monitor 220 may determine which images overlap with any given print swath of a print head of the printer 100 according to the arrangement indicated by the printing instructions. All images that overlap with one and the same print swath will, accordingly, at some point be processed, in particular printed, simultaneously. When it is determined where the print swath is actually positioned with respect to the arrangement indicated by the printing instructions, it may therefore also be determined, by the process monitor 220, which images are currently being printed simultaneously.

In case that there is data available which of the images is currently, for example in a list of print jobs and/or images, indicated as being the active job, the process monitor 220 may determine that all images which overlap a print swath that also overlaps that image indicated as currently active are currently being processed simultaneously by the printer 100.

It should be understood that instead of the print swath also other geometrical objects may be used to determine, similarly as described before, which images are currently being processed simultaneously by the printer.

Other options for determining which images of the plurality of images are currently being processed simultaneously by the printer 100 will be described in the following.

The controller 200 of the printing system 1000 according to FIG. 3 may optionally comprise at least one interface 260. The at least one interface 260 may be configured to receive the plurality of images. The at least one interface 260 may also be configured to receive property data indicating properties of the printer 100 and/or properties of a medium supplied to the printer 100 for printing thereon.

The nesting logic 280 may be configured to create and/or update printing instructions for the printer 100 based on a data signal 77 received from the at least one interface 260. The signal may indicate, or contain, any of the property data received by the at least one interface 260. Accordingly, the nesting logic 280 may be configured to create and/or update the printing instructions for the printer 100 based on properties of the received images and/or based on the property data indicated by the signal 77.

The original printing instructions or the modified printing instructions may be transmitted by the controller 200 to the printer in, or with, a controller output signal 71. The printing instructions created and/or updated by the nesting logic 280 indicate to the printer 100 in which arrangement (e.g. nested in which way) the printer 100 is to print the plurality of images onto the medium.

For example, the property data may indicate that the medium has a certain width, while the properties of the received images may indicate that some images of the received plurality of images have a width smaller than half the width of the medium such that at least two of said images may be arranged next to each other in the width direction on a medium. In short, the nesting logic 280 may perform a nesting of all, or at least some of, the received plurality of images.

As has been described, when the controller 200 comprises the nesting logic 280, the printing instructions based on which the process monitor may determine which images are currently being processed simultaneously by the printer 100 are created within and by the controller 200 itself. As an alternative, the controller 200 may be provided with an interface 260 configured to receive finalized printing instructions which may then be forwarded to the process monitor 220, and optionally also to the printer 100.

It should be understood that the process monitor 220, the display 240 and/or the nesting logic 280 may be integrated into one physical device and therefore be comprised within the same housing. However, as an alternative, the process monitor 220, the display 240 and/or the nesting logic 280 may be realized as remote devices connected by a network or as software modules executed by a server removed from the physical location of the printer 100, or even by a plurality of servers.

For example, the nesting logic 280 may be realized by a processor and a memory of a cloud server which relates a signal indicating the printing instructions to a mobile phone with a memory and a processor which run the process monitor 220 as an app. Additional information from the printer 100 where the actual current print swath is located with respect to the images to which the printing instructions relate may be transmitted by the printer 100 in the printer output signal 72 to the mobile phone that runs, or provides, the process monitor 220. The printer output signal 72 may in this case be transmitted e.g. over the internet, over a mobile communications network, a local area network and/or the like.

For example, the data from the printer 100 may indicate that the current print swath is located 10 cm from the start of the first image according to the printing instructions, or is located a certain number of widths of print swaths from the start of the printing, or that a certain amount of time has passed with continuous printing (from which, given an assumed constant movement speed of the print swath along the medium, again the current location of the print swath may be determined) and so on.

The controller 200 may comprise a user interface 265 configured to receive an abortion command from a user, the abortion command indicating that processing of at least one of the plurality of images should be aborted, in particular indicating that printing of at least one of the plurality of images should be aborted. The nesting logic 280 may be configured to update the printing instructions for the printer 100 to abort the processing, in particular printing, of the at least one of the plurality of images indicated by the abortion command.

For example, a user may press a pause button or in another way indicate that the printer 100 should pause processing of the plurality of images. The user interface 265 may then give the user the option to send the abortion command, optionally specifying parameters of the abortion command such as information about which image should be aborted under any circumstances, which image should not be aborted under any circumstances and for which images it is acceptable either that they are aborted or not aborted.

The nesting logic 280 may be configured such that, when at least one of the images indicated by the abortion command is one of the images being currently processed, in particular printed, as determined by the process monitor 220, the printing instructions for the printer 100 are updated such that, of the images being currently processed, in particular printed, only the images indicated by the abortion command are aborted, whereas images not indicated by the abortion command continue to be processed, in particular printed.

In the event that the abortion command comprises information about the processing of which images should be aborted under any circumstances, not aborted under any circumstances or the processing of which is acceptable to be aborted or not aborted, the nesting logic 280 may update the printing instructions such that the images of which the processing should not be aborted under any circumstances continue to be processed while the images the processing of which was indicated to be aborted under any circumstances are aborted, and wherein, for the images for which both abortion and continued processing is indicated to be acceptable by the abortion command, it is decided on an image-by-image basis whether they are aborted or not, based on specified criteria. Such criteria may include minimizing amount of medium consumed, minimizing time spent processing, in particular printing, minimizing an amount of marking material expended and so on. Several criteria may be used and may be provided with specific weights.

Figure 4:
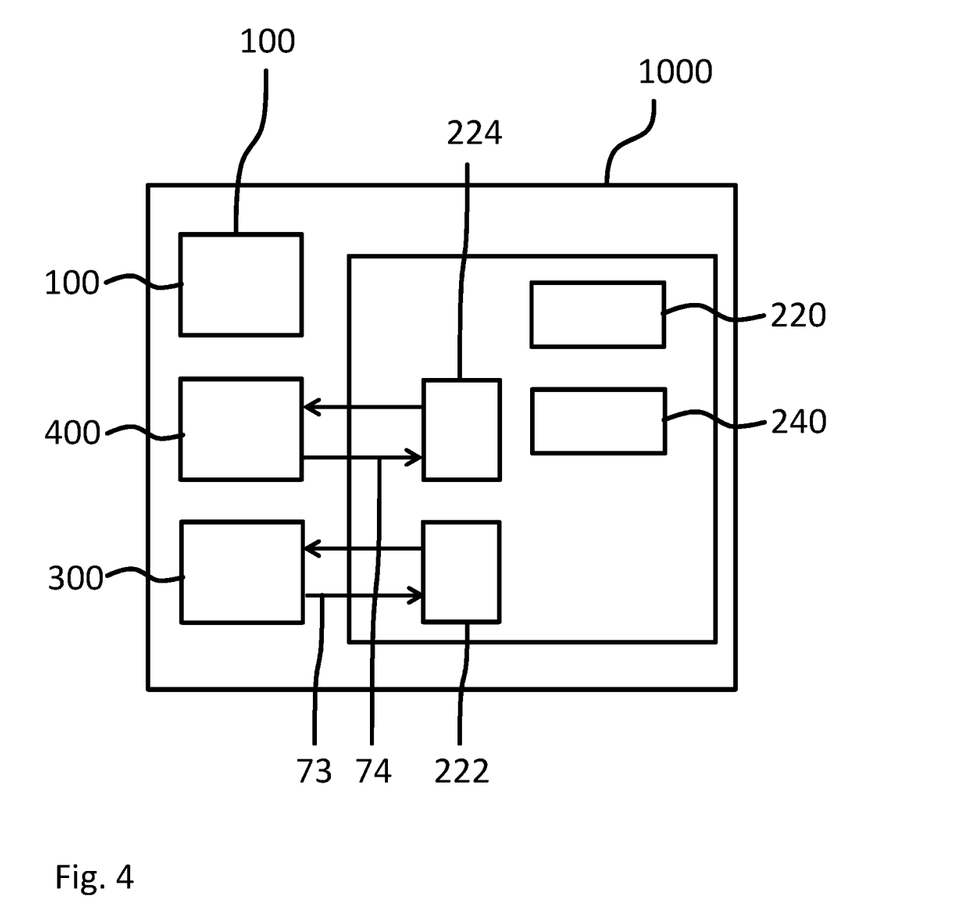
FIG. 4 a schematic diagram of a variant printing system according to yet another embodiment of the second aspect as well as of a variant control according to yet another embodiment of the first aspect.

FIG. 4 shows a schematic diagram of a variant printing system 1000 according to yet another embodiment of the second aspect as well as of a variant controller 200 according to yet another embodiment of the first aspect. The variant printing system 1000 of FIG. 4 differs from the printing system 1000 according to FIG. 1 in that it further comprises a cutter 300 configured to cut the medium before, during or after the printer 100 processes or has processed said medium and/or in that the printing system 1000 of FIG. 4 further comprises a curing unit 400 configured to cure the medium, during or after the printer 100 processes or has processed said medium.

The cutter 300 and/or the curing unit 400 may be separate from the printer 100, as suggested in FIG. 4.

Alternatively, the cutter 300 may be provided as a part of the printer 100, and the cutting performed by the cutter 300 may be considered a part of the processing of the plurality of images by the printer 100. For example, the processing of the plurality of images may comprise first marking the medium to create the images on the medium and then cutting, using the cutter 300, the medium to individualize the images from one another and/or to trim them.

Similarly, the curing unit 400 may be provided as a part of the printer 100, and the curing performed by the curing unit 400 may be considered a part of the processing of the plurality of images by the printer 100. For example, the processing of the plurality of images may comprise first marking the medium to create the images on the medium and then curing using the curing unit, the medium to render the marking material on the recording medium inert. When both a cutter 300 and a curing unit 400 are present, preferably the medium will be first processed by the curing unit and only thereafter by the cutter 300.

The controller 200 in FIG. 4 comprises a cutting monitor 222 configured to determine which, or the vicinity of which, of the plurality of images is currently being cut by the cutter 300. The display 240 may be configured to indicate to the user the images currently being cut by the cutter 300 based on the determining by the cutting monitor 224.

The cutting monitor 222 may be realized at least partially as hardware and/or at least partially as software, as has been described in the foregoing.

The cutting monitor 222 may be provided as a part of the process monitor 220 or separate from the process monitor 220. The controller 200 may be configured to provide the printer 100 not only with printing instructions from a nesting logic 280, which may or may not be part of the controller 200, but may also be configured to provide the cutter 300 with cutting information indicating where the cutter 300 is to cut the printed medium.

As has been described before with respect to the nesting logic 280, also the cutting instructions may be created by, or within, the controller 200 itself, or may be received by the controller 200 from an external element or system to be used and/or to be transmitted to the printer and/or the cutter 300. The cutting monitor 222 may be configured to determine which, or the vicinity of which, of the plurality of images is currently being cut by the cutter 300 based on the cutting instructions and/or based on the printing instructions and/or based on the printer output signal 71 from the printer 100 and/or based on a cutter output signal 73 transmitted by the cutter 300 to the controller 200, in particular specifically to the cutting monitor 222. If the cutter 300 is integrated into the printer 100, the cutter output signal 73 may be a part of the printer output signal 71.

The display 240 may be configured to display to the user graphical representations 242-246 as shown in FIG. 2 and show additionally a graphical representation of a position of the cutter 300 with respect to the graphical representation 242 of the medium which indicate to the user a position at which the cutter 300 is currently positioned with respect to the medium.

The controller 200 in FIG. 4 further comprises a curing monitor 224 configured to determine which, or the vicinity of which, of the plurality of images is currently being cured by the curing unit 400. The display 240 may be configured to indicate to the user the images currently being cured by the curing unit 400 based on the determining by the curing monitor 224.

The curing monitor 224 may be realized at least partially as hardware and/or at least partially as software, as has been described in the foregoing.

The curing monitor 224 may be provided as a part of the process monitor 220 or separate from the process monitor 220. The controller 200 may be configured to provide the curing unit 400 with curing information indicating where and/or how the curing unit 400 is to cure the recording medium. For example, certain inks may have to be cured with a higher dosage of radiation and/or longer exposure time and/or with radiation of different wavelengths than other inks.

As has been described before with respect to the nesting logic 280, also the curing instructions may be created by, or within, the controller 200 itself, or may be received by the controller 200 from an external element or system to be used and/or to be transmitted to the printer and/or the curing unit 400. The curing monitor 224 may be configured to determine which of the plurality of images is currently being cured by the curing unit 400 based on the curing instructions and/or based on the printing instructions and/or based on the printer output signal 71 from the printer 100 and/or based on a curing unit output signal 74 transmitted by the curing unit 400 to the controller 200, in particular specifically to the curing monitor 224. If the curing unit 400 is integrated into the printer 100, the curing unit output signal 74 may be a part of the printer output signal 71.

The display 240 may be configured to display to the user graphical representations 242-246 as shown in FIG. 2 and show additionally a graphical representation of a position of the curing unit 400 with respect to the graphical representation of the medium 242 which indicate to the user a position at which the curing unit 400 is currently positioned with respect to the medium.

It should be understood that also for some, or all, possible additional steps during the processing of the images by the printer 100, corresponding monitoring units may be provided (e.g. as has been described with respect to the cutting monitor 222 and/or the curing monitor 224) and the display 240 may be configured to accordingly display results of the monitoring by those monitoring units, e.g. to indicate which images are currently being processed in the corresponding step of the processing.

For example, a drying monitor may be provided that determines which images are currently being dried by an optional drier of the printing system 1000, the drier being configured to direct hot and/or cold air along the recording medium. Then, the display may be configured to indicate, using the graphical representations 243, 244, 245 of the images, which images are currently being dried simultaneously. In some embodiments, the drying monitor and the drier may replace the curing monitor 224 and the curing unit 400, respectively, in the printing system 1000.

Figure 5:
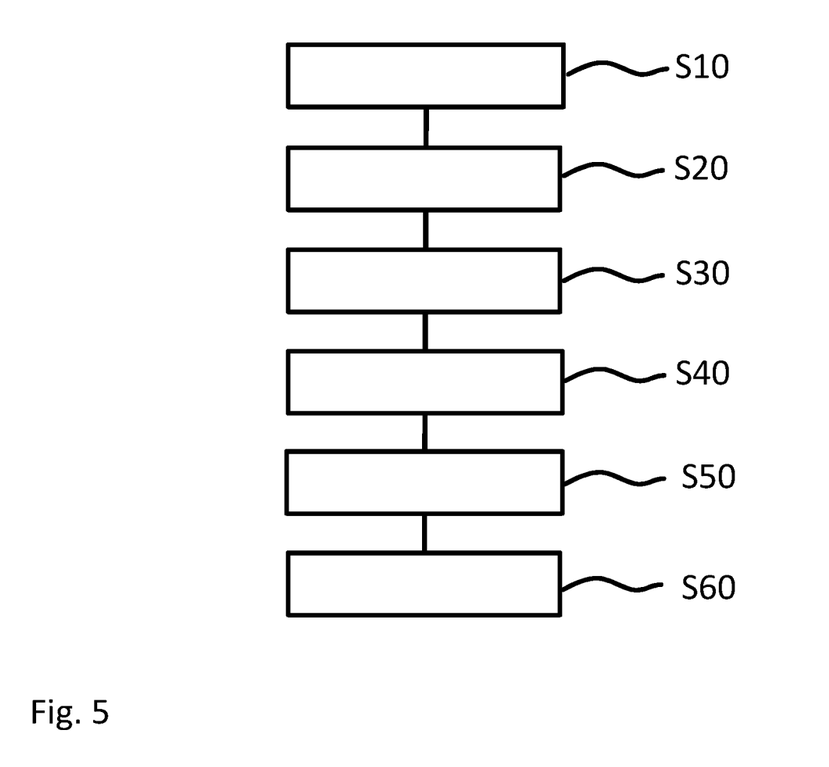
FIG. 5 a schematic flow diagram illustrating a method according to an embodiment of the third aspect.

FIG. 5 shows a schematic flow diagram illustrating a method according to an embodiment of the third aspect, i.e. a method for controlling a printer. The method according to FIG. 5 may be performed using any printing system according to an embodiment of the first aspect, or any controller according to an embodiment of the second aspect. Accordingly, the method of FIG. 5 may be modified and adapted according to all variations and modifications described herein with respect to the printing system according to the first aspect and/or the controller according to the second aspect. In discussing the method illustrating in FIG. 5, reference will also be made to the FIGS. 1 through 4 as well as to the reference signs therein as and to the corresponding description.

In a step S10, a plurality of images is received, e.g. by the printing system 1000, in particular by the controller 200.

In a step S20, multiple images of the received plurality of images are processed simultaneously by a printer, e.g. the printer 100 of the printing system 1000. As has been discussed in the foregoing, such processing may include printing, cutting, curing and the like.

In an optional step S30, additional data may be received, in particular at, or by, the controller 200. For example, property data indicating properties of the printer 100 and/or property data indicating properties of a recording medium supplied to the printer 100 for printing thereon may be received, e.g. as has been described in the foregoing with respect to the interface 260 of the controller 200. Additionally, or alternatively, an abortion command may be received as described with respect to the user interface 265 in the foregoing. Further additionally or alternatively, a printer output signal 72, a cutter output signal 73 and/or a curing unit output signal 74, each e.g. as described above, may be received.

Some of the additional data received in step S30 may be used to create and/or update, in an optional step S40, printing instructions for the printer 100, the printing instructions instructing the printer 100 in which arrangement the printer 100 is to print the plurality of images onto the recording medium, or even which images the printer 100 is to print onto the recording medium and how.

In a step S50, it is determined which images of the plurality of images are currently being processed simultaneously by the printer 100. In particular, it may be determined which images of the plurality of images are currently being printed, which images of the plurality of images are currently being cured (e.g. by the curing unit 400 as described above) and/or which images of the plurality of images are currently being cut (e.g. by the cutter 300 as described above). The determining S50 may be based on any or all of the additional data that may have been received in the optional step S30, as has been described in the foregoing. Specifically, the printing instructions created and/or updated in the optional step S40 may be used in the determining S50, e.g. as has been described with respect to the nesting logic 280 and the process monitor 220 in the foregoing.

In a step S60, it is indicated to a user, e.g. graphically using the display 240, which images of the plurality of images have been determined to be currently being processed simultaneously by the printer 100, or specifically, which images of the plurality of images have been determined to be currently being printed, cured, cut and the like. The indicating S60 to the user is preferably performed visually such as has been described with respect to the display 240 and in connection with FIG. 2 in the foregoing. However, other methods of indicating information to the user may be employed additionally or alternatively, such as acoustic and/or haptic signals.

Figure 6:
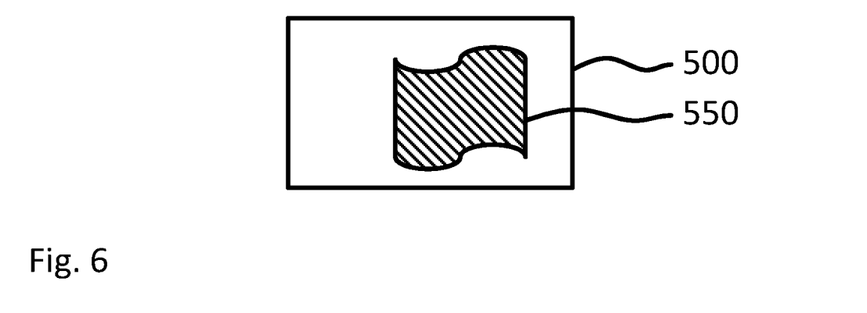
FIG. 6 a schematic block diagram of a software medium according to an embodiment of the fourth aspect.

FIG. 6 shows a schematic block diagram of a software medium 500 according to an embodiment of the fourth aspect. The software medium 500 is preferably a non-volatile software storage medium and comprises executable code 550 configured to, when executed, perform the method according to any embodiment of the third aspect, e.g. as described with respect to the printing system 1000, the controller 200, according to any or all of the FIGS. 1 to 4 and/or according to any of the variants and modifications of the printing system 1000, the controller 200 and/or of the method described herein.

The software medium 500 may, specifically, be formed as a CD or a CD-ROM, a DVD or a DVD-ROM, a BluRay disc or a BluRay-ROM disc, a magnetic hard drive, a solid state disk (SSD) hard drive, a USB memory device and so on.

While detailed embodiments of the present invention are disclosed herein, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. In particular, features presented and described in separate dependent claims may be applied in combination and any advantageous combination of such claims are herewith disclosed.

Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language).

It will be evident that the described embodiments may be varied in many ways. All such modifications as would be evident to one skilled in the art starting from what is explicitly described are intended to be included.

One basic idea of the invention may be summarized as follows: a print controller determines which images of one or more print jobs are currently being processed (such as printed, cured, cut etc.) simultaneously, and indicates the results to a user.

The invention claimed is:

1. A controller for a printer capable of processing multiple images simultaneously on one recording medium, comprising:
   a process monitor configured to determine which images of a plurality of images are currently being processed simultaneously by the printer on one recording medium;
   a display configured to indicate to a user, based on the determining by the process monitor, which images of the plurality of images are currently being processed simultaneously by the printer on said one recording medium;
   at least one interface configured to receive the plurality of images and for receiving property data indicating properties of the printer and/or of a medium supplied to the printer for printing thereon;
   a nesting logic configured to create and/or update printing instructions for the printer based on properties of the received images and/or based on the property data, the printing instructions indicating to the printer in which arrangement the printer is to print the plurality of images onto the medium; and
   a user interface configured to receive an abortion command from a user, the abortion command indicating that processing of at least one of the plurality of images should be aborted,
   wherein the process monitor is configured to determine which images of the plurality of images are currently being printed simultaneously using the printing instructions, and
   wherein the nesting logic is configured to update the printing instructions for the printer to abort the processing of the at least one of the plurality of images indicated by the abortion command.

2. The controller according to claim 1, further comprising:
   an error handler configured to determine whether an error has occurred during printing by the printer; and further configured to apply an error handling procedure to all of the images that were affected by the occurred error, based on the determining by the process monitor.

3. A printing system, comprising:
   a printer capable of printing multiple images simultaneously; and
   the controller according to claim 2 operatively coupled to said printer.

4. The controller according to claim 1, wherein the controller further comprises:
   a cutting monitor configured to determine which, or the vicinity of which, of the plurality of images is currently being cut by a cutter, and wherein the display is further configured to indicate to the user the images currently being cut by the cutter.

5. A printing system, comprising:
a printer capable of printing multiple images simultaneously; and
the controller according to claim 4 operatively coupled to said printer.

6. The controller according to claim 1, wherein the controller further comprises:
a curing monitor configured to determine which of the plurality of images is currently being cured by a curing unit, and
wherein the display is further configured to indicate to the user the images currently being cured by the curing unit.

7. A printing system, comprising:
a printer capable of printing multiple images simultaneously; and
the controller according to claim 6 operatively coupled to said printer.

8. The controller according to claim 1, wherein the nesting logic is configured such that, when at least one of the images indicated by the abortion command is one of the images being currently processed as determined by the process monitor, the printing instructions for the printer are updated such that, of the images being currently processed, only the images indicated by the abortion command are aborted, whereas images not indicated by the abortion command continue to be processed.

9. The controller according to claim 1, wherein the abortion command comprises an indication that at least one of the images is to be finished before printing is aborted, and
wherein the nesting logic is configured such that, when at least one of the images indicated to be finished by the abortion command is one of the images being currently processed as determined by the process monitor, the printing instructions for the printer are updated such that, of the images being currently processed, at least the images indicated by the abortion command to be finished are finished before the processing of the at least one of the plurality of images indicated by the abortion command is aborted.

10. The controller according to claim 1, wherein the display is further configured to display a graphical representation of the plurality of images according to the arrangement of the images indicated by the printing instructions, and
wherein the display unit is further configured to display a graphical indication, based on the determining of the process monitor, of which images are currently being processed simultaneously on said one recording medium.

11. A printing system, comprising:
a printer capable of printing multiple images simultaneously; and
the controller according to claim 1 operatively coupled to said printer.

12. The printing system of claim 11, wherein the printing system comprises a cutter, and wherein the controller further comprises:
a cutting monitor configured to determine which, or the vicinity of which, of the plurality of images is currently being cut by a cutter, and
wherein the display is further configured to indicate to the user the images currently being cut by the cutter.

13. The printing system of claim 11,
wherein the printing system comprises a curing unit and wherein the controller further comprises:
a curing monitor configured to determine which of the plurality of images is currently being cured by a curing unit, and
wherein the display is further configured to indicate to the user the images currently being cured by the curing unit.

14. A method of using the controller according to claim 1 for controlling a printer, the method comprising steps of:
receiving a plurality of images;
processing, by the printer, multiple images of the plurality of images simultaneously on one recording medium;
determining which images of the plurality of images are currently being processed simultaneously by the printer on said one recording medium; and
indicating to a user which images of the plurality of images have been determined to be currently being processed simultaneously by the printer on said one recording medium.

15. The method of claim 14, further comprising steps of:
receiving property data indicating properties of the printer and/or of a medium supplied to the printer for printing thereon; and
creating and/or updating printing instructions for the printer based on properties of the received images and/or based on the property data, the printing instructions indicating to the printer in which arrangement the printer is to print the plurality of images onto the medium, and
wherein the determining is performed using the printing instructions.

16. A non-transitory software medium comprising executable program code configured to, when executed, perform the method according to claim 14.

* * * * *